United States Patent [19]

Grangeon et al.

[11] Patent Number: 5,824,220
[45] Date of Patent: Oct. 20, 1998

[54] INORGANIC POROUS SUPPORT FOR A FILTER MEMBRANE, AND METHOD OF MANUFACTURE

[75] Inventors: André Grangeon, Valreas; Philippe Lescoche, Nyons, both of France

[73] Assignee: T.A.M.I. Industries, Nyons, France

[21] Appl. No.: 704,776

[22] PCT Filed: Jan. 25, 1996

[86] PCT No.: PCT/FR96/00128

§ 371 Date: Sep. 24, 1996

§ 102(e) Date: Sep. 24, 1996

[87] PCT Pub. No.: WO96/22829

PCT Pub. Date: Aug. 1, 1996

[30] Foreign Application Priority Data

Jan. 25, 1995 [FR] France ................................. 95 01063

[51] Int. Cl.⁶ ........................... B01D 69/10; C22C 29/12; B22F 1/00; B22F 1/04
[52] U.S. Cl. ................................ 210/490; 55/523; 75/234; 75/235; 96/4; 210/496; 210/510.1; 419/2; 419/32; 419/33; 419/41
[58] Field of Search ............................... 210/321.84, 490, 210/496, 500.25, 500.26, 510.1, 489, 505; 427/244, 245, 376.2, 376.3, 376.4, 383.5; 428/404; 55/523; 96/4; 106/600, 601, 632, 635, 286.1, 286.2, 286.4, 286.5, 287.17

[56] References Cited

U.S. PATENT DOCUMENTS

| | | | |
|---|---|---|---|
| 3,524,548 | 8/1970 | McDonald et al. | 210/510.1 |
| 3,939,079 | 2/1976 | Uchiyama et al. | 210/510.1 |
| 4,071,369 | 1/1978 | Kurz et al. | |
| 4,278,544 | 7/1981 | Takashima | 210/510.1 |
| 4,528,099 | 7/1985 | Rieger et al. | 210/510.1 |
| 4,690,763 | 9/1987 | Rieger et al. | 210/510.1 |
| 4,698,157 | 10/1987 | Gillot | 210/496 |
| 4,758,542 | 7/1988 | Parker . | |
| 4,814,202 | 3/1989 | Castelas | 427/244 |
| 4,889,630 | 12/1989 | Reinhardt et al. | 210/505 |
| 4,929,406 | 5/1990 | Abe et al. | 427/244 |
| 5,175,132 | 12/1992 | Ketcham et al. . | |

FOREIGN PATENT DOCUMENTS

| | | |
|---|---|---|
| 236249 | 9/1987 | European Pat. Off. . |
| A-0 236 249 | 9/1987 | European Pat. Off. . |
| 586102 | 3/1994 | European Pat. Off. . |
| A-0 586 102 | 3/1994 | European Pat. Off. . |
| 2693921 | 1/1994 | France . |
| A-2 693 921 | 1/1994 | France . |

Primary Examiner—Joseph W. Drodge
Attorney, Agent, or Firm—Bacon & Thomas

[57] ABSTRACT

The invention relates to an inorganic support obtained by sintering and intended to constitute a support for a filter membrane, the support comprising: an inorganic feedstock having a grain size greater than 20 $\mu$m and constituted by a metal compound containing only one metal selected from the following metals: aluminum, silicon, and titanium; and an inorganic binder that reacts with the feedstock under the heat treatment conditions of the support in the range 1200° C. to 1500° C., so as to obtain a support having porosity greater than 25% and mechanical strength defined by ultimate bending stress for plane supports greater than 15 MPa, and by ultimate tensile stress for tubular supports greater than 5 MPa, without including a compound liable to create microcracks in the support.

14 Claims, No Drawings

5,824,220

INORGANIC POROUS SUPPORT FOR A FILTER MEMBRANE, AND METHOD OF MANUFACTURE

This application is a 371 of PCT/FR96/00128, filed on Jan. 25, 1996.

FIELD OF THE INVENTION

The present invention relates to the technical field of separating molecules or particles by implementing separator elements generally called "membranes" made of inorganic materials and constituted by a porous support on which at least one separator layer is deposited having nature and morphology adapted to perform separation of molecules or particles contained in the fluid medium to be treated.

More precisely, the invention seeks to provide inorganic porous supports constituting inorganic membranes.

PRIOR ART

Conventionally, a membrane is defined by associating together a porous support of ceramic material on which layers of inorganic material are deposited, which layers are bonded to one another and to the support by sintering. The role of the layers is to separate the molecular or particulate species, while the role of the support is to provide the mechanical strength necessary for making layers that are thin. Thus, the support must provide mechanical strength without participating in the hydraulic resistance of the membrane, while the layer must define permeability without participating in the mechanical strength.

Numerous types of support exist in the state of the art. The commonest type is a support made of pure alumina. Its manufacture comprises operations of mixing alumina with various additives such as an organic binder enabling the grains to hold together prior to sintering, a lubricant facilitating flow of the paste through the die during shaping, or a wetting agent making the particles easier to wet by the liquid in which they are in suspension. The resulting paste is then subjected to a shaping operation via a die whose shape is adapted to the future geometry of the support. After the extruded substance has dried, it is baked to begin reaction between the particles of alumina and also, in particular, to eliminate all organic matter which could inhibit the sintering reaction. Thereafter, it is sintered by heat treatment at a high temperature. For alumina, the sintering temperature is about 1800° C.

Conventionally, sintering corresponds to solid state reaction between inorganic particles which, in simplified manner, can be considered as being spherical in shape. After the shaping and drying operations, the particles are in contact with one another. Each contact point defines a kind of neck of practically zero diameter, and the volume around a neck can be thought of as the concave portion of a capillary meniscus. During heat treatment, the particles are subjected to changes of state. Two main parameters govern sintering, firstly the equivalent diameter of the concave portion around each neck, which depends on particle size, and secondly the viscosity of the material and also its partial pressure, which depend on the temperature of the heat treatment. Thus, the smaller the size of the particle, the smaller the equivalent diameter of the concave portions. High viscosity is therefore sufficient to form necks, such that the temperature of heat treatment is low. Conversely, the larger the size of the particles, the lower the viscosity, thus requiring a high sintering temperature. Nevertheless, increasing the quantity of energy supplied gives rise to a sintered support whose density is equal to that of its particles, such that its porosity is zero.

To obtain a body that is porous after sintering, it is therefore necessary to limit the quantity of heat energy so as to obtain necks of sufficient volume for porosity to be large and for mechanical strength to be high. It should be assumed that the higher the sintering temperature, the thicker the necks, thereby obtaining a support of increased mechanical strength and low porosity.

In an attempt to remedy this contradiction, patent application FR 2 693 921 proposes making an inorganic support whose raw material composition comprises thermally stable alumina associated with an oxide of titanium. Bonding between the particles of alumina is provided by the oxide of titanium which acts as an inorganic binder. That method makes it possible to sinter at much lower temperatures than when using pure alumina. Nevertheless, if the sintering temperature is raised to values greater than 1275° C., then the reaction between the alumina and the titanium causes a titanium aluminate phase to appear which possesses a coefficient of linear expansion that is very different from those of alumina and titanium oxide. Thus, during cooling following sintering, this difference in expansion gives rise to stresses which generate cracking. The resulting product is fragile and not usable as a membrane support.

U.S. Pat. No. 5,175,132 discloses a ceramic composition comprising inorganic feedstock and an inorganic binder formed by a mixture of the oxides of at least two metals. That composition is designed to enable sintering to take place at a temperature lying in the range 800° C. to 1100° and to obtain a support that is not porous. It is clear that such a document does not enable a porous support suitable for filtering to be obtained. In addition, such a document does not solve the problem of the support cracking which appears due to the presence of a titanium aluminate phase at temperatures above 1275° C.

SUMMARY OF THE INVENTION

The invention seeks to remedy the above-specified drawbacks by proposing an inorganic support for filtering which is adapted to have good mechanical strength because the sintering temperature is not limited, while nevertheless presenting high porosity, in excess of 25%.

To achieve this object, the sintered inorganic support of the invention comprises:

an inorganic feedstock; and an inorganic binder whose percentage by weight relative to the feedstock is less than 70%, said inorganic binder being in the form of a mixture of oxides of at least two metals;

characterized in that to make a support for a filter membrane:

the inorganic feedstock has a grain size greater than 20 $\mu$m;

the inorganic feedstock is a metal compound containing a single metal selected from the following metals: aluminum, silicon, and titanium; and the inorganic binder reacts with the feedstock under the conditions of support heat treatment lying in the range 1200° C. to 1500° C. in such a manner as to obtain a support having porosity greater than 25% and mechanical strength defined by the ultimate bending stress of plane supports greater than 15 MPa, and by the ultimate tensile stress of tubular supports greater than 5 MPa, without including a compound liable to create microcracking of the support.

BEST METHOD OF PERFORMING THE INVENTION

The invention thus seeks to provide an inorganic support comprising particles of a first type, referred to as "feedstock", having a grain size greater than 20 μm. Under the heat treatment conditions applied to the porous body, no surface softening appears of the feedstock particles, such that the material thereof cannot participate in forming necks as defined in the preamble of the present patent application. Conversely, and still under the heat treatment conditions applied to the porous body, the second type of particle in the composition of the support is subject to considerable surface softening, thereby enabling it to stick to the particles of the feedstock. This second type of particle is referred to as inorganic binder.

It can thus be seen that for a given sintering temperature, the inorganic feedstock and the inorganic binder have very different viscosities. For the sintering temperature in the range 1200° C. to 1500° C., the inorganic feedstock behaves as framework insofar as it is not sufficiently reactive, while the inorganic binder serves to bind together the particles of the feedstock to provide cohesion of the porous support. It should be understood that the inorganic feedstock is considered as being non-reactive under the heat treatment conditions of the porous support if it comprises feedstock only. It should be assumed that the inorganic feedstock is a metal compound containing a single metal selected from the following metals: alumina, silicon, and titanium. Also, the inorganic binder is in the form of a mixture of oxides of at least two metals, so that under the heat treatment conditions of the porous support there never appears any compound that would cause microcracks to come into existence. The inorganic binder reacts with the feedstock so as to obtain a support having porosity greater than 25% and mechanical strength which is defined, for plane pieces of the support, by its ultimate bending stress being in excess of 15 MPa.

Table 1 below shows the percentage of feedstock relative to the inorganic binder for two extreme values of porosity and for two inorganic binders, namely (potter's) clay and titanium zirconium oxide (TiZrO$_4$).

TABLE 1

| Porosity to be obtained | Porosity of feedstock = 25.95% | | Porosity of feedstock = 47.64% | |
|---|---|---|---|---|
| | binder = clay | binder = TiZrO$_4$ | binder = clay | binder = TiZrO$_4$ |
| 20% | 4.5% | 8.7% | 29.83% | 57.64% |
| 30% | impossible | impossible | 19.15% | 37.01% |
| 40% | impossible | impossible | 8.47% | 16.38% |

In Table 1, the feedstock used was corundum.

To make a support suitable for filtering a liquid medium, it is necessary to have a texture with an equivalent mean diameter of about 5 μm to 6 μm and porosity greater than 25%. Table 1 makes it possible to determine proportions for the inorganic binder depending on the nature of the binder and the porosity that is to be obtained. The weight percentage of binder relative to the feedstock is less than 70%.

In a first variant embodiment, the inorganic binder used is a clay. Even though the definition of clay is not very precise and does not correspond to an exact composition, it is accepted that clays form a part of the following mineral groups, namely: nesosilicates, soro-silicates, cyclosilicates, inosilicates, phyllosilicates, and tectosilicates. The description below relates to an embodiment of a support in which the inorganic binder used was a clay.

EXAMPLE 1

The clay used was made from a mixture of three earths, and its final composition in percentage was:

SiO$_2$: 67
Al$_2$O$_3$: 22.1
Fe$_2$O$_3$: 1.63
CaO: 0.92
MgO: 0.1
TiO$_2$: 0.66
Na$_2$O: 3.4
K$_2$O: 0.84

Corundum was used as an example feedstock having grain size of 63 μm. The clay and the corundum were mixed by milling.

The suspension comprised:

inorganic substances (clay and corundum);

a binder in the form of sodium lignosulfonate;

a pressing agent in the form of crystalline waxes in emulsion with water; and water as a dispersing agent.

After milling in a ball mill, the suspension was dried in an atomizer.

The resulting powder was then compressed in the form of a 10 cm×10 cm plate having a thickness of 2 mm.

Table 2 below shows the influence of feedstock proportion.

TABLE 2

| Final % of Al$_2$O$_3$ | % of SiO$_2$ | Corundum grain size (μm) | Corundum % | Sintering temp. (°C.) | Ultimate bending (MPa) | Pore dia. (μm) | Porosity % |
|---|---|---|---|---|---|---|---|
| 61.05 | 33.5 | 63 | 50 | 1180 | 25 | 5 | 31.0 |
| 68.84 | 26.8 | 63 | 60 | 1180 | 27 | 5 | 31.0 |
| 76.83 | 20.1 | 63 | 70 | 1180 | 20 | 4 | 22.3 |
| 84.42 | 13.4 | 63 | 80 | 1180 | 18 | 4 | 27.9 |

Whatever the proportion of corundum, pore size distribution was centered on a single peak. Porosity values varied with feedstock proportion.

The ultimate bending strength shows that the product was indeed sintered at a temperature of 1180° C. and that the flux effect of the clay was effective. Nevertheless the strength decreased with increasing proportion of feedstock.

This inorganic binding effect between corundum and clay can be applied to feedstocks other than corundum.

It is thus possible to use:

silicon carbide; or titanium oxide in the form of rutile sand.

A second embodiment of the invention consists in the inorganic binder comprising a titanate of formula TiMO where M is a metal. Appropriate metals essentially comprise silicon, aluminum, and preferably, zirconium, calcium, copper, and manganese.

There are three main ways in which the titanate of formula TiMO can be made.

EXAMPLE 2

The titanate was made before mixing with the alumina. Thus, each titanate used, such as calcium titanate, copper titanate, zirconium titanate, or manganese titanate corresponded to an ordinary commercially-available substance.

Each titanate was respectively mixed with corundum having a grain size of 22.8 μm so that the ratio of alumina over titanate was equal to 2. Shaping comprised the following sequence:

milling the alumina/titanate mixture in an aqueous medium in the presence of a deflocculating agent;

drying;

adding pressing agents in the form of liquid wax;

granulating the mixture in an EIRICH granulator; and pressing in the form of plates, e.g. 100 mm×100 mm ×2.5 mm.

Sintering was performed at various temperatures and the strength of the plates was measured by a bending test to breakage. The porosity and the mean diameter were defined by mercury porometry. Table 3 below gives the measured values.

TABLE 3

| Sintering temp. (°C.) | Added metal: zirconium | | Added metal: calcium | | Added metal: copper | | Added metal: manganese | |
|---|---|---|---|---|---|---|---|---|
| | Mean pore dia. (μm) | Ultimate bending (MPa) | Mean pore dia. (μm) | Ultimate bending (MPa) | Mean pore dia. (μm) | Ultimate bending (MPa) | Mean pore dia. (μm) | Ultimate bending (MPa) |
| 1180 | 2.5 | 10 | 1.9 | 10 | 2.1 | 27 | 2.5 | 24 |
| 1240 | 3.0 | 15 | 2.5 | 10 | 3.5 | 30 | 3.4 | 30 |
| 1280 | 3.5 | 15 | 3.1 | 15 | 4.2 | 40 | 5.0 | 35 |
| 1300 | 4.2 | 18 | 3.9 | 16 | 5.6 | 48 | 6.4 | 44 |
| 1375 | 5.8 | 31 | 5.1 | 30 | 6.5 | 56 | 7.2 | 54 |

These results show that mechanical strength increases with temperature regardless of which metal is added. Thus, the temperature of 1280° C. can be exceeded to a considerable extent without any drop in mechanical strength appearing. It is thus possible to envisage performing sintering at temperatures that may be as high as 1500° C. Of the metals selected, copper and manganese have an effect that is much more marked than calcium and zirconium.

EXAMPLE 3

The titanate of formula TiMO may be made during sintering of the porous body by adding the metal in the form of a metal oxide.

The oxides of copper, manganese, calcium, and zirconium had a grain size of less than 325 mesh.

Shaping comprised the following sequence:

milling the mixture of alumina, titanium oxide, and oxides of the metal M in an aqueous medium in the presence of a deflocculating agent;

drying;

adding pressing agents in the form of liquid wax;

granulation of the mixture in an EIRICH granulator; and pressing in the form of plates of 100 mm×100 mm×2.5 mm.

Sintering was performed at various temperatures and the strength of the plates was measured by a bending test to breakage. Porosity and mean diameter were defined by mercury porometry.

Table 4 below gives the values measured.

TABLE 4

| Sintering temp. (°C.) | Added metal: zirconium | | Added metal: calcium | | Added metal: copper | | Added metal: manganese | |
|---|---|---|---|---|---|---|---|---|
| | Mean pore dia. (μm) | Ultimate bending (MPa) | Mean pore dia. (μm) | Ultimate bending (MPa) | Mean pore dia. (μm) | Ultimate bending (MPa) | Mean pore dia. (μm) | Ultimate bending (MPa) |
| 1180 | | friable | | friable | | friable | | friable |
| 1240 | 2.5 | 9 | 2.3 | 8 | 2.8 | 15 | 3.3 | 19 |
| 1280 | 3.0 | 12 | 3.1 | 12 | 3.7 | 25 | 4.1 | 27 |
| 1300 | 3.8 | 15 | 3.5 | 14 | 5.1 | 32 | 5.6 | 36 |
| 1375 | 4.9 | 29 | 5 | 28 | 6.6 | 45 | 7.1 | 51 |

In the same manner as the results given in Table 3, the mechanical strength of the porous support increases with sintering temperature, even for temperatures greater than 1280° C. It should be considered that no titanium aluminate phase appears, which makes it possible to increase sintering temperature and thus to increase the strength of the resulting support.

The effectiveness of the various metals is in the same order as in the action of the titanates, i.e. in decreasing order: manganese, copper, zirconium, and calcium.

EXAMPLE 4

The titanate of formula of TiMO can be obtained during the sintering by adding the metal M in the form of a metal salt.

The metals were added in nitrate form because of their solubility in water. The compositions were made as follows:

milling in an aqueous medium and in the presence of alumina, titanium oxide, nitrate of the additive metal, and a deflocculating agent;

drying;

adding pressing agents in the form of liquid wax;

granulation of the mixture in an EIRICH granulator; and pressing in the form of plates of 100 mm×100 mm×2.5 mm.

During sintering, the additional metal reacted with the titanium oxide to form a titanate, thereby avoiding the formation of aluminum titanate.

Table 5 below gives the results obtained.

TABLE 5

| Sintering temp. (°C.) | Added metal: zirconium | | Added metal: calcium | | Added metal: copper | | Added metal: manganese | |
|---|---|---|---|---|---|---|---|---|
| | Mean pore dia. (μm) | Ultimate bending (MPa) | Mean pore dia. (μm) | Ultimate bending (MPa) | Mean pore dia. (μm) | Ultimate bending (MPa) | Mean pore dia. (μm) | Ultimate bending (MPa) |
| 1180 | 4.0 | 10 | 4.5 | 10 | 4.5 | 27 | 4.5 | 24 |
| 1240 | 5.0 | 15 | 5.0 | 10 | 6.0 | 30 | 6.5 | 30 |
| 1280 | 6.0 | 15 | 5.5 | 15 | 6.8 | 40 | 7.2 | 35 |
| 1300 | 7.0 | 18 | 6.5 | 16 | 7.8 | 48 | 8.0 | 44 |
| 1375 | 8.5 | 29 | 7.6 | 31 | 8.5 | 55 | 8.5 | 52 |

Whatever metal was added, the breaking strength in bending increased with increasing temperature. The mechanical strength results of plates in which zirconium or calcium had been added were much weaker than those obtained in the presence of copper or manganese. The temperature of 1280° C. was no longer a maximum for mechanical strength, thereby demonstrating that no titanium aluminate was formed. In accordance with the invention, a support can thus be obtained having mechanical strength defined by bending stress (or breaking stress) exceeding 15 MPa.

To sum up, the combined use of an inorganic feedstock and a binder comprising at least an oxide of one metal and an oxide of another metal, makes it possible, regardless of heat treatment temperature, to avoid the appearance of a compound that reduces the mechanical strength of the porous support. The presence of oxides of at least two metals in the composition of the inorganic binder avoids the appearance of a compound that causes microcracking.

The above examples show the advantage of the invention for inorganic membranes of plane shape. It is clear that the invention can be applied to filter membranes of some other shape, e.g. tubular.

Tube manufacture is an operation that is more complex than the manufacture of plates. The main difference lies in shaping. Plates can be made by pressing dry powders. The problem of drying is thus avoided.

Tubes are made by extruding a paste that needs to be dried properly in order to avoid large amounts of deformation. This drying operation makes tube manufacture much more complex.

Two compositions were tested in this example:
 a composition of the invention based on a mixture of alumina and titanium oxide to which a very small quantity of zirconium oxide was added. This composition is called composition A;
 a composition of the invention based on a mixture of alumina and titanium oxide, to which a large quantity of zirconium oxide was added. This composition is called composition B.

The alumina grain size in both compositions was 29.2 μm.

The following table gives the respective proportions of the various ingredients.

| Reference of the composition | % alumina | % titanium oxide | % zirconium oxide |
|---|---|---|---|
| A | 67.0 | 32.3 | 0.7 |
| B | 64.2 | 31.0 | 4.8 |

Tubes were made from those two compositions by an extrusion method which required a plastic paste to be prepared.

The sintering temperature of the tubes was in the range 1200° C. to 1375°. After that operation, the tubes were characterized with respect to porosity, mechanical strength measured as internal bursting pressure (a value which makes it possible to determine tensile stress), and in crystallographic structure in order to look for the presence of the titanium aluminate phase ($Al_2TiO_5$).

The results obtained are given in the following table.

|  | Sintering temperature | | | | | | | | | | | | | |
|---|---|---|---|---|---|---|---|---|---|---|---|---|---|---|
| Composition | 1200° C. | | 1250° C. | | 1275° C. | | 1300° C. | | 1325° C. | | 1350° C. | | 1375° C. | |
| reference | A | B | A | B | A | B | A | B | A | B | A | B | A | B |
| Porosity (%) | 36 | 35 | 36 | 37 | 36 | 36 | 37 | 38 | 37 | 37 | 37 | 36 | 33 | 36 |
| Bursting pressure (MPa) | 2.1 | 2.1 | 3.7 | 3.6 | 4.4 | 4.7 | 5.7 | 5.3 | 6.6 | 6.2 | 6.2 | 6.3 | 2.7 | 6.1 |
| Tensile stress (MPa) | 3.1 | 3.1 | 5.5 | 5.4 | 6.6 | 7 | 8.5 | 8 | 10 | 9.3 | 9.3 | 9.4 | 4 | 9.1 |
| Presence of $Al_2TiO_5$ | N | N | N | N | N | N | N | N | N | N | N | N | Y | N |

N = no
Y = yes

The presence of a small quantity of zirconium oxide (composition A) makes it possible to increase the sintering temperature to above 1350° C. without the $Al_2TiO_5$ phase appearing. Under such conditions, sintering is improved and the mechanical strength of the tube increases with temperature.

Increasing the quantity of zirconium (composition B) makes it possible to increase the sintering temperature even further (1375° C.) without the $Al_2TiO_5$ phase appearing. Under calcination conditions, the mechanical strength of the tubes in the above series of tests was not improved.

Zirconium oxide thus has an inhibiting effect on the $Al_2TiO_5$ phase appearing. This effect appears at small percentages and enables sintering temperature to be increased, with the consequence of a clear improvement in mechanical strength. Thus, in a tubular embodiment, a support has been obtained having porosity greater than 25% and mechanical strength defined by its tensile stress value in excess of 5 MPa.

SUITABILITY FOR INDUSTRIAL APPLICATION

The invention is suitable for application in the field of filtering, understood broadly, of molecules or particles contained in a fluid medium.

We claim:
1. A sintered inorganic support made by sintering a body formed from inorganic feedstock and inorganic binder at a temperature in the range of 1200° C. to 1500° C. wherein said inorganic feedstock is a metal compound containing a single metal selected from the group consisting of aluminum, silicon and titanium and said inorganic feedstock has a grain size greater than 20 microns;
  said inorganic binder is selected from the group consisting of clay and titanate having the formula TiMO wherein M is a metal and said inorganic binder is present in an amount which is less than 70% relative to the amount of inorganic feedstock;
  whereby compounds which can cause the formation of microcracks therein are essentially absent from said support and said sintered inorganic support has a porosity greater than 25%;

with the proviso that said inorganic support has a mechanical strength defined by ultimate bending stress greater than 15 MPa when said inorganic support is in a planar configuration and a mechanical strength defined by a tensile strength value greater than 5 MPa when said inorganic support is in the form of a tube.

2. The inorganic support of claim 1 wherein said inorganic feedstock is alumina.

3. The inorganic support of claim 1 wherein the inorganic feedstock is silicon carbide.

4. The inorganic support of claim 1 wherein the inorganic feedstock is rutile sand.

5. The inorganic support of claim 1 wherein the metal M is selected from the group consisting of zirconium, calcium, copper, manganese, silicon and aluminum.

6. The inorganic support of claim 1 which further includes at least one separator layer thereon adapted to separate molecules or particles contained in a fluid medium to be treated.

7. A method for making an inorganic support which comprises:

mixing inorganic feedstock and clay or a titanium containing material with at least one additive selected from the group consisting of a binder, a lubricant and a deflocculating agent to form a mixture;

milling said mixture in an aqueous medium;

drying said mixture;

pressing said dried mixture to form a shaped mass; and sintering said shaped mass at a temperature in the range of 1200° C. to 1500° C.;

wherein:
said inorganic feedstock is a metal compound containing a single metal selected from the group consisting of aluminum, silicon and titanium and said inorganic feedstock has a grain size greater than 20 microns;
said clay or titanium containing material is present in an amount which is less than 70% relative to the amount of inorganic feedstock; and
said titanium containing material has the formula TiMO wherein M is a metal or said titanium containing material is in the form of titanium oxide in combination with an oxide of said metal M or is in the form of titanium oxide in combination with a salt of said metal M.

8. The method of claim 7, wherein said titanium containing material is titanate having the formula TiMO.

9. The method of claim 7 wherein said titanium containing material is in the form of titanium oxide in combination with an oxide of said metal M.

10. The method of claim 7 wherein said titanium containing material is in the form of titanium oxide in combination with a salt of said metal M.

11. A method for making an inorganic support which comprises:

mixing inorganic feedstock and clay or a titanium containing material with at least one additive selected from the group consisting of a binder, a lubricant and a deflocculating agent to form a mixture;

milling said mixture in an aqueous medium to form a paste;

extruding said paste to form an extrudate;

drying said extrudate;

and then sintering said extrudate at a temperature in the range of 1200° C. to 1500° C.;

wherein:
said inorganic feedstock is a metal compound containing a single metal selected from the group consisting of aluminum, silicon and titanium and said inorganic feedstock has a grain size greater than 20 microns;
said clay or titanium containing material is present in an amount which is less than 70% relative to the amount of inorganic feedstock; and
said titanium containing material has the formula TiMO wherein M is a metal or said titanium containing material is in the form of titanium oxide in combination with an oxide of said metal M or is in the form of titanium oxide in combination with a salt of said metal M.

12. The method of claim 11 wherein said titanium containing material is titanate of the formula TiMO.

13. The method of claim 11 wherein said titanium containing material is in the form of titanium oxide in combination with an oxide of said metal M.

14. The method of claim 11 wherein said titanium containing material is in the form of titanium oxide in combination with a salt of said metal M.

* * * * *